US008027877B2

(12) United States Patent  (10) Patent No.: US 8,027,877 B2
Crolley  (45) Date of Patent: Sep. 27, 2011

(54) SYSTEM AND METHOD OF PROVIDING ADVERTISEMENTS TO MOBILE DEVICES

(75) Inventor: C. Wayne Crolley, Bryant, AR (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 463 days.

(21) Appl. No.: 11/517,026

(22) Filed: Sep. 7, 2006

(65) Prior Publication Data

US 2007/0061205 A1    Mar. 15, 2007

Related U.S. Application Data

(63) Continuation-in-part of application No. 11/110,938, filed on Apr. 20, 2005, and a continuation-in-part of application No. 11/110,970, filed on Apr. 20, 2005, and a continuation-in-part of application No. 11/110,980, filed on Apr. 20, 2005.

(51) Int. Cl.
G06Q 30/00  (2006.01)
H04W 24/00  (2009.01)
(52) U.S. Cl. ............... 705/14.63; 705/14.58; 455/456.3
(58) Field of Classification Search ............ 705/14, 705/10, 14.27, 14.28, 14.45, 14.52, 14.6, 705/14.64, 14.4, 14.49, 14.58; 370/254, 370/259
See application file for complete search history.

(56) References Cited

U.S. PATENT DOCUMENTS

| 5,214,793 | A |   | 5/1993  | Conway et al. |
| 5,235,633 | A |   | 8/1993  | Dennison et al. |
| 5,295,180 | A |   | 3/1994  | Vendetti et al. |
| 5,523,950 | A | * | 6/1996  | Peterson .................... 455/456.5 |
| 5,627,549 | A |   | 5/1997  | Park |
| 5,797,097 | A |   | 8/1998  | Roach et al. |
| 5,903,816 | A |   | 5/1999  | Broadwin et al. |
| 5,943,653 | A |   | 8/1999  | Ross et al. |
| 5,999,525 | A |   | 12/1999 | Krishnaswamy et al. |
| 6,178,411 | B1 |  | 1/2001  | Reiter |
| 6,253,146 | B1 |  | 6/2001  | Hanson et al. |
| 6,269,361 | B1 |  | 7/2001  | Davis et al. |
| 6,275,989 | B1 | * | 8/2001 | Broadwin et al. .............. 725/37 |
| 6,332,127 | B1 |  | 12/2001 | Bandera et al. |
| 6,335,927 | B1 |  | 1/2002  | Elliott et al. |

(Continued)

FOREIGN PATENT DOCUMENTS

EP    1 115 077 A2    7/2001

(Continued)

OTHER PUBLICATIONS

Notice of Allowance dated Oct. 18, 2010; U.S. Appl. No. 11/110,938, Filed Apr. 20, 2005; 26 pages.

(Continued)

*Primary Examiner* — John G Weiss
*Assistant Examiner* — Adam Chornesky
(74) *Attorney, Agent, or Firm* — Toler Law Group

(57) ABSTRACT

The present disclosure is directed to a system and method of providing advertisements to mobile devices. In an embodiment, an approximate position of a mobile device along a path can be determined based at least partially on data identifying the mobile device within a cellular coverage region. A service can be selected at least partially based on the approximate position, and an advertisement relating to the selected service can be sent to the mobile device.

23 Claims, 3 Drawing Sheets

U.S. PATENT DOCUMENTS

| | | | |
|---|---|---|---|
| 6,363,250 B1 | 3/2002 | Lindell | |
| 6,381,534 B2 | 4/2002 | Takayama et al. | |
| 6,405,364 B1 | 6/2002 | Bowman-Amuah | |
| 6,422,464 B1 | 7/2002 | Terranova | |
| 6,516,192 B1* | 2/2003 | Spaur et al. | 455/450 |
| 6,522,875 B1* | 2/2003 | Dowling et al. | 455/414.3 |
| 6,526,275 B1* | 2/2003 | Calvert | 455/418 |
| 6,570,851 B1 | 5/2003 | Koskelainen et al. | |
| 6,647,269 B2* | 11/2003 | Hendrey et al. | 455/456.3 |
| 6,711,408 B1 | 3/2004 | Raith | |
| 6,731,625 B1 | 5/2004 | Eastep et al. | |
| 6,757,545 B2 | 6/2004 | Nowak et al. | |
| 6,795,700 B2 | 9/2004 | Karaoguz et al. | |
| 6,823,257 B2* | 11/2004 | Clapper | 701/207 |
| 6,842,620 B2 | 1/2005 | Smith et al. | |
| 6,845,091 B2 | 1/2005 | Ogier et al. | |
| 6,847,822 B1 | 1/2005 | Dennison et al. | |
| 6,859,722 B2* | 2/2005 | Jones | 701/200 |
| 6,912,230 B1 | 6/2005 | Salkini et al. | |
| 6,941,574 B1* | 9/2005 | Broadwin et al. | 725/37 |
| 6,944,447 B2 | 9/2005 | Portman et al. | |
| 6,993,326 B2* | 1/2006 | Link et al. | 455/414.1 |
| 7,002,489 B1 | 2/2006 | Denker et al. | |
| 7,006,881 B1* | 2/2006 | Hoffberg et al. | 700/83 |
| 7,023,818 B1* | 4/2006 | Elliott | 370/328 |
| 7,099,936 B2 | 8/2006 | Chase et al. | |
| 7,103,368 B2* | 9/2006 | Teshima | 455/456.3 |
| 7,110,880 B2 | 9/2006 | Breed et al. | |
| 7,120,235 B2 | 10/2006 | Altberg et al. | |
| 7,127,261 B2 | 10/2006 | Van Erlach | |
| 7,130,807 B1 | 10/2006 | Mikurak | |
| 7,162,365 B2* | 1/2007 | Clapper | 701/207 |
| 7,176,813 B2 | 2/2007 | Kawamata et al. | |
| 7,289,531 B2 | 10/2007 | Van Den Bosch et al. | |
| 7,290,046 B1 | 10/2007 | Kumar | |
| 7,305,240 B2 | 12/2007 | Chou et al. | |
| 7,308,414 B2 | 12/2007 | Parker et al. | |
| 7,343,317 B2* | 3/2008 | Jokinen et al. | 705/14.64 |
| 7,367,042 B1* | 4/2008 | Dakss et al. | 725/60 |
| 7,369,856 B2 | 5/2008 | Ovadia | |
| 7,418,252 B2 | 8/2008 | Erskine et al. | |
| 7,418,402 B2 | 8/2008 | McCrossin et al. | |
| 7,421,454 B2 | 9/2008 | DeShan et al. | |
| 7,439,878 B2 | 10/2008 | Kato et al. | |
| 7,516,086 B2 | 4/2009 | Chu et al. | |
| 7,778,873 B2 | 8/2010 | Crolley | |
| 2001/0044751 A1 | 11/2001 | Pugliese et al. | |
| 2002/0022476 A1* | 2/2002 | Go | 455/414 |
| 2002/0032035 A1* | 3/2002 | Teshima | 455/456 |
| 2002/0037716 A1 | 3/2002 | McKenna et al. | |
| 2002/0046084 A1 | 4/2002 | Steele et al. | |
| 2002/0049640 A1 | 4/2002 | Sheriff et al. | |
| 2002/0087505 A1 | 7/2002 | Smith et al. | |
| 2002/0119788 A1* | 8/2002 | Parupudi et al. | 455/456 |
| 2002/0147634 A1 | 10/2002 | Jacoby et al. | |
| 2002/0147645 A1 | 10/2002 | Alao et al. | |
| 2002/0161598 A1 | 10/2002 | Kim | |
| 2002/0161646 A1* | 10/2002 | Gailey et al. | 705/14 |
| 2002/0184089 A1 | 12/2002 | Tsou et al. | |
| 2003/0036848 A1 | 2/2003 | Sheha et al. | |
| 2003/0046158 A1* | 3/2003 | Kratky | 705/14 |
| 2003/0046420 A1 | 3/2003 | Breiter et al. | |
| 2003/0054844 A1* | 3/2003 | Anvekar et al. | 455/466 |
| 2003/0065805 A1 | 4/2003 | Barnes | |
| 2003/0070167 A1 | 4/2003 | Holtz et al. | |
| 2003/0074207 A1 | 4/2003 | Pace et al. | |
| 2003/0134648 A1* | 7/2003 | Reed et al. | 455/456 |
| 2003/0154126 A1* | 8/2003 | Gehlot et al. | 705/14 |
| 2003/0195808 A1* | 10/2003 | Brown et al. | 705/14 |
| 2003/0200299 A1 | 10/2003 | Jamison, III | |
| 2003/0208754 A1 | 11/2003 | Sridhar et al. | |
| 2003/0216960 A1* | 11/2003 | Postrel | 705/14 |
| 2003/0220835 A1* | 11/2003 | Barnes, Jr. | 705/14 |
| 2004/0002896 A1 | 1/2004 | Alanen et al. | |
| 2004/0015824 A1 | 1/2004 | Felkey et al. | |
| 2004/0036622 A1 | 2/2004 | Dukach et al. | |
| 2004/0054589 A1 | 3/2004 | Nicholas et al. | |
| 2004/0076279 A1 | 4/2004 | Taschereau | |
| 2004/0122735 A1 | 6/2004 | Meshkin | |
| 2004/0143842 A1 | 7/2004 | Joshi | |
| 2004/0186766 A1 | 9/2004 | Fellenstein et al. | |
| 2004/0186769 A1 | 9/2004 | Mangold et al. | |
| 2004/0192351 A1* | 9/2004 | Duncan | 455/456.3 |
| 2004/0203712 A1 | 10/2004 | Murai et al. | |
| 2004/0215559 A1 | 10/2004 | Rebenack et al. | |
| 2004/0220881 A1 | 11/2004 | Powell | |
| 2004/0225564 A1 | 11/2004 | Walsh et al. | |
| 2004/0225746 A1 | 11/2004 | Niell et al. | |
| 2004/0260470 A1 | 12/2004 | Rast | |
| 2004/0267617 A1 | 12/2004 | Yanase | |
| 2005/0009499 A1 | 1/2005 | Koster | |
| 2005/0021401 A1 | 1/2005 | Postrel | |
| 2005/0027590 A9 | 2/2005 | Gailey et al. | |
| 2005/0027591 A9 | 2/2005 | Gailey et al. | |
| 2005/0027594 A1 | 2/2005 | Yasnovsky et al. | |
| 2005/0030907 A1 | 2/2005 | Lou et al. | |
| 2005/0055431 A1 | 3/2005 | Jones et al. | |
| 2005/0065844 A1 | 3/2005 | Raj et al. | |
| 2005/0075093 A1 | 4/2005 | Lei et al. | |
| 2005/0079878 A1 | 4/2005 | Smith et al. | |
| 2005/0102180 A1 | 5/2005 | Gailey et al. | |
| 2005/0107066 A1 | 5/2005 | Erskine et al. | |
| 2005/0144243 A1 | 6/2005 | Cheng | |
| 2005/0154996 A1 | 7/2005 | Othmer | |
| 2005/0209861 A1 | 9/2005 | Hewes et al. | |
| 2005/0221843 A1 | 10/2005 | Friedman et al. | |
| 2005/0227700 A1 | 10/2005 | Kirkland et al. | |
| 2005/0239448 A1* | 10/2005 | Bayne | 455/414.3 |
| 2005/0239495 A1* | 10/2005 | Bayne | 455/550.1 |
| 2005/0289590 A1* | 12/2005 | Cheok et al. | 725/37 |
| 2006/0020548 A1 | 1/2006 | Flather | |
| 2006/0026067 A1 | 2/2006 | Nicholas et al. | |
| 2006/0036548 A1 | 2/2006 | Roever et al. | |
| 2006/0059511 A1 | 3/2006 | Nocifera et al. | |
| 2006/0074764 A1 | 4/2006 | Schmitt et al. | |
| 2006/0087979 A1 | 4/2006 | Schine et al. | |
| 2006/0089157 A1 | 4/2006 | Casey et al. | |
| 2006/0092931 A1 | 5/2006 | Walter et al. | |
| 2006/0106850 A1 | 5/2006 | Morgan et al. | |
| 2006/0111967 A1 | 5/2006 | Forbes | |
| 2006/0116507 A1 | 6/2006 | Oppermann et al. | |
| 2006/0167784 A1 | 7/2006 | Hoffberg | |
| 2006/0173745 A1 | 8/2006 | Disterdick | |
| 2006/0178932 A1* | 8/2006 | Lang | 705/14 |
| 2006/0184640 A1 | 8/2006 | Hatch | |
| 2006/0200381 A1 | 9/2006 | Elkholy et al. | |
| 2006/0211437 A1 | 9/2006 | Yang | |
| 2006/0239254 A1 | 10/2006 | Short et al. | |
| 2006/0240808 A1* | 10/2006 | Crolley | 455/414.1 |
| 2006/0242009 A1 | 10/2006 | Crolley | |
| 2006/0242010 A1 | 10/2006 | Crolley | |
| 2006/0253291 A1 | 11/2006 | Ishigai et al. | |
| 2007/0013548 A1 | 1/2007 | Sendrowicz | |
| 2007/0027839 A1* | 2/2007 | Ives | 707/3 |
| 2007/0061205 A1* | 3/2007 | Crolley | 705/14 |
| 2007/0094698 A1 | 4/2007 | Bountour et al. | |
| 2007/0208864 A1 | 9/2007 | Flynn et al. | |
| 2007/0287473 A1 | 12/2007 | Dupray | |
| 2008/0010372 A1 | 1/2008 | Khedouri et al. | |
| 2008/0033805 A1* | 2/2008 | Padin | 705/14 |
| 2008/0076432 A1* | 3/2008 | Senarath et al. | 455/442 |
| 2008/0097858 A1 | 4/2008 | Vucina et al. | |
| 2008/0109317 A1 | 5/2008 | Singh | |
| 2008/0139217 A1 | 6/2008 | Alizadeh-Shabdiz et al. | |

FOREIGN PATENT DOCUMENTS

| | | | |
|---|---|---|---|
| EP | 1 202 203 A3 | 10/2003 | |

OTHER PUBLICATIONS

Non-Final Office Action for U.S. Appl. No. 11/110,970; mailed Apr. 17, 2008; 14 pp.

Non-Final Office Action for U.S. Appl. No. 11/110,970; mailed Nov. 18, 2008; 30 pp.

Final Office Action for U.S. Appl. No. 11/110,970; mailed May 7, 2009; 32 pp.

Non-Final Office Action for U.S. Appl. No. 11/110,970; mailed Oct. 7, 2009; 34 pp.
Final Office Action for U.S. Appl. No. 11/110,970; mailed Mar. 30, 2010; 38 pp.
Non Final Office Action for U.S. Appl. No. 11/110,980; mailed Apr. 21, 2008; 13 pp.
Non Final Office Action for U.S. Appl. No. 11/110,980; mailed Nov. 18, 2008; 30 pp.
Final Office Action for U.S. Appl. No. 11/110,980; mailed Apr. 27, 2009; 36 pp.
Non Final Office Action for U.S. Appl. No. 11/110,980; mailed Oct. 2, 2010; 28 pp.

Non Final Office Action for U.S. Appl. No. 11/110,938; mailed Apr. 14, 2008; 16 pp.
Non Final Office Action for U.S. Appl. No. 11/110,938; mailed Oct. 28, 2008; 24 pp.
Final Office Action for U.S. Appl. No. 11/110,938; mailed Apr. 7, 2009; 30 pp.
Non Final Office Action for U.S. Appl. No. 11/110,938; mailed Sep. 1, 2009; 30 pp.
Ex Parte Quayle Action for U.S. Appl. No. 11/110,938; mailed Mar. 2, 2010; 8 pp.

* cited by examiner

SYSTEM AND METHOD OF PROVIDING ADVERTISEMENTS TO MOBILE DEVICES

CROSS-REFERENCE TO RELATED APPLICATIONS

The present application claims priority from and is a continuation-in-part of patent application Ser. No. 11/110,938, filed Apr. 20, 2005 and entitled "System and Method of Providing Advertisements to Portable Communication Devices," the content of which is expressly incorporated herein by reference in its entirety. The present application also claims priority from and is a continuation-in-part of patent application Ser. No. 11/110,970, filed Apr. 20, 2005 and entitled "System and Method of Providing Advertisements to Cellular Devices," the content of which is expressly incorporated herein by reference in its entirety. The present application also claims priority from and is a continuation-in-part of patent application Ser. No. 11/110,980, filed Apr. 20, 2005 and entitled "System and Method of Providing Advertisements to Wi-Fi Devices," the content of which is expressly incorporated herein by reference in its entirety.

FIELD OF THE DISCLOSURE

The present disclosure relates to providing advertisements to mobile devices.

BACKGROUND

Mobile devices, e.g., cellular telephones, portable digital assistants, 802.11 devices, are useful for obtaining information while traveling. For example, a user can call an information service to obtain the location of a gas station, restaurant, etc. Further, a user can access the Internet or a Wide Area Network via a mobile device and input a query in order to obtain information about a business, a local attraction, a civic event, or any other point of interest. These systems are not typically proactive and require an input from a user before information about a business, location, etc. is sent to the requesting device. Additionally, GPS systems have been provided that can track the location of a user and show the location of the user on an electronic map. However, these systems include limited information and typically, the electronic map provided by the GPS system is simply a map with little other information. Accordingly, there is a need for an improved system and method of providing advertisements to mobile devices.

DETAILED DESCRIPTION OF THE DRAWINGS

In a particular embodiment, a system is disclosed that includes a processor and a processor readable medium accessible to the processor. The processor readable medium contains instructions executable by the processor to receive first data identifying a mobile device, a cellular tower, and a time. The processor instructions also include instructions to query a first database storing second data correlating the cellular tower to a segment of a freeway route. The processor instructions further include instructions to identify an approximate position of the mobile device along the freeway route. The processor instructions also include instructions to query a second database storing third data correlating an available service to at least one predetermined position along the freeway route. The processor instructions also include instructions to send an advertisement of the service to the mobile device.

In another embodiment, a mobile device is disclosed. The mobile device includes a processor and a processor readable medium accessible to the processor. The mobile device also includes a computer program embedded in the processor readable medium. The computer program includes instructions to transmit data to an advertisement provider system, the data identifying the mobile device, a first time, and a cellular tower providing cellular communication to the mobile device at the first time. The computer program also includes instructions to communicate with the advertisement provider system to receive a selected advertisement, the selected advertisement selected based on the transmitted data.

In another embodiment, a method of providing advertisements to mobile devices is disclosed. The method includes receiving first data identifying a mobile device within a first cellular coverage region at a first time. The method also includes determining an approximate position of the mobile device along a predefined path using at least the first data. The method further includes selecting a service from a plurality of services at least partially based on the approximate position. The method also includes sending an advertisement of the service to the mobile device.

In another embodiment, a processor readable medium embodying executable instructions is disclosed. The executable instructions include instructions to transmit data to an advertisement provider system. The data identifies a mobile device, a first time, and a cellular tower providing cellular communication to the mobile device at the first time.

Figure 1:
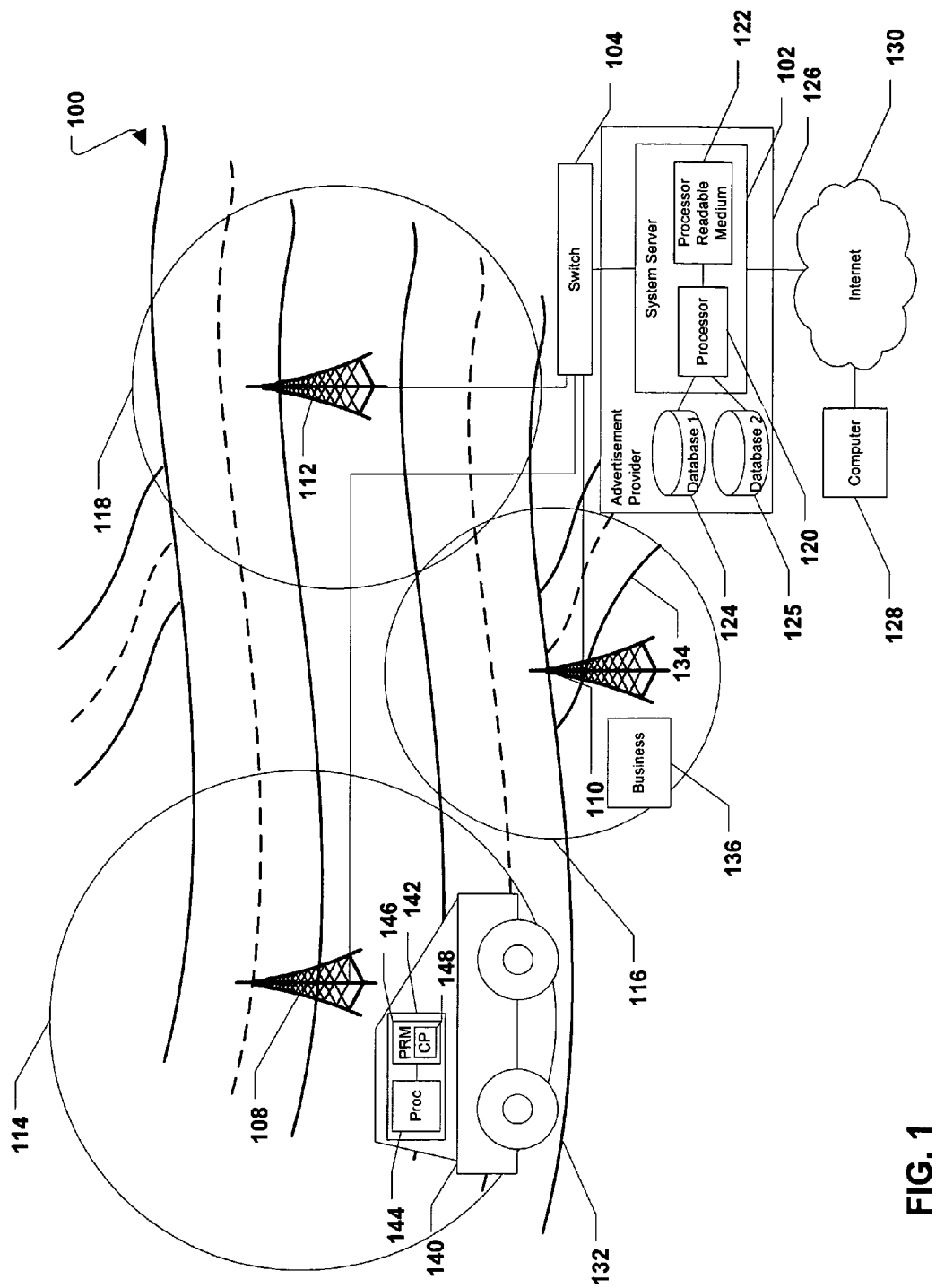
FIG. 1 is a block diagram of a particular illustrative embodiment of a system to provide advertisements to mobile devices.

Referring to FIG. 1, a system to provide advertisements to mobile devices is shown and is generally designated 100. As shown, the system 100 includes a system server 102 that is coupled to a router/switch 104. The router/switch 104, in turn, is coupled to a first cellular tower 108, a second cellular tower 110, and a third cellular tower 112. Further, each cellular tower 108, 110, and 112 provides a separate coverage region 114, 116, and 118, respectively, for the system 100.

As depicted in FIG. 1, the system server 102 includes a processor 120 and a computer readable medium 122 that is accessible to the processor 120. A first database 124 and a second database 125 are also coupled to the system server 102. In a particular embodiment, the first database 124 can include information correlating cellular tower coverage to segments of one or more streets or roads, such as a freeway 132. The second database 125 can include a plurality of advertisements for services such as those provided by one or more businesses 136 or points of interest within the coverage regions 114, 116, 118. The second database 125 can also include information correlating available services to positions along the freeway 132. As shown in FIG. 1, the system server 102, the processor 120, the processor readable medium 122, the first database 124 and the second database 125 can be located at an advertisement provider 126. FIG. 1 further shows that a computer 128 can communicate with the system server 102 via the Internet 130. A system manager, subscriber, or some other party can communicate with the system server 102 using the computer 128.

In an illustrative embodiment, the cellular towers 108, 112, 114 can be deployed so that the coverage regions 114, 116, 118 provided by the cellular towers overlap a freeway 132. In a particular embodiment, the freeway 132 can be any type of roadway used to carry public transportation, e.g., one or more vehicles 140. In a particular illustrative embodiment, the freeway 132 is an interstate highway. Also, the freeway 132 can include at least one freeway exit 134 that provides access to one or more businesses 136. A cellular tower 110 can be deployed so that it is adjacent to, or proximal to, the freeway exit 134 and the business 136.

In a particular embodiment, the system server 102 can include a computer program including processor instructions embedded within the processor readable medium 122. The computer program can include logic to execute a method that allows the system server 102 to monitor the movement of a mobile device 142, for example, within a vehicle 140. As the vehicle 140 and the mobile device 142 approach the freeway exit 134, one or more advertisements for services associated with the business 136 that is accessible via the freeway exit 134 can be automatically transmitted to the mobile device 142. Information such as other services or business that are available via the freeway exit 134 can also be provided.

In a particular embodiment, the computer program embedded within the processor readable medium 122 can include logic to receive and store data identifying a mobile device, a cellular tower, and a time. In an illustrative embodiment, such data can be received from the mobile device 142 via a cellular tower 108, 110, 112 coupled to the router/switch 104. The mobile device 142 can identify a cellular tower providing cellular coverage at the identified time and transmit the information to the advertisement provider 126. The computer program can include logic to query a first database 124 storing data correlating the cellular tower to a segment of the freeway 134.

In a particular embodiment, the first database 124 can store records identifying the first cellular tower 108 and a portion of the highway 132 within the coverage area 114 of the second cellular tower 108. Further, the database 124 can store records identifying the third cellular tower 110 with a portion of the highway 132 within the coverage area 116, and the cellular tower 112 with a portion of the highway 132 within the coverage area 118. In an illustrative embodiment, the first database 124 identifies portions of the freeway 132 via a linear measure along the path or route defined by the freeway 132, such as kilometers of travel along the freeway 132 from a particular point, without determining a two-dimensional geographical indication, such as latitude and longitude coordinates, location on a map, any other two- or three-dimensional indication of location, or any combination thereof.

In a particular embodiment, the computer program can include logic to identify an approximate position of the mobile device along the freeway route 132. In an illustrative embodiment, the computer program may query the first database 124 to identify a portion or segment of the freeway 132 associated with an identified cellular tower. The approximate position of the mobile device 124 can include all or part of the segment of the freeway 132 identified by the first database 124 as correlated to the identified cellular tower, and thus can be expressed as a linear range, a position and uncertainty, a probability distribution, or any combination thereof. In an illustrative embodiment, a more accurate position approximation can be determined by comparing the segment of the freeway to data previously received from the mobile device 142, such as a cellular tower and time.

In a particular illustrative embodiment, the computer program can determine an average or recent rate of travel for the mobile device 142 along the freeway 132 and approximate positions of the mobile device 142 at specified times, and thus compute or extrapolate a current or future position of the mobile device 142 along the freeway 132. The computer program can use additional data to further enhance the approximate position, such as construction zones, areas of high traffic during particular times, current weather conditions, other information affecting travel along the freeway 132, or any combination thereof.

In a particular embodiment, the computer program can include logic to query the second database 125 to retrieve data correlating available services to predetermined positions along the freeway 132. In an illustrative embodiment, the computer program may retrieve from the second database 125 all services within a specified range of the approximate position of the mobile device 142, such as one or more services provided by the business 136 positioned at the freeway exit 134. In a particular illustrative embodiment, all services available at positions within 1 kilometer (km), 10 km, 50 km, or any other specified range from the approximate position can be retrieved from the second database 125. In a particular illustrative embodiment, the second database 125 may provide data specifying operating hours for a business providing the service, data specifying a category of the service, such as food, gas, lodging, tourist attraction, emergency medial services, general merchandise sales, automotive repairs, or any combination thereof.

In a particular embodiment, the computer program can include logic to select at least one service and send at least one advertisement of the service to the mobile device. In an illustrative embodiment, all available services may be selected. In another illustrative embodiment, one or more services may be selected by comparing available services to preferences provided by a user of the mobile device 142. In yet another illustrative embodiment, one or more service may be selected using logic to predict a preference. For example, restaurant services may be selected at common meal times, while lodging services may be selected at nighttime. In a particular embodiment, the advertisements for the selected services can be sent via cellular transmission, and may be chosen to accommodate particular audio, video, or data transfer limitations or capabilities of the mobile device 142. In a particular embodiment, the advertisement can be sent via another wireless network (not shown) in communication with the mobile device 142, such as via a Wi-Fi access point.

In a particular illustrative embodiment, the mobile device 142 can be a cellular phone located in the vehicle 140 traveling on the freeway 132. When the mobile device 142 is within a coverage region 114, 116, or 118, the mobile device 142 can receive transmissions from the respective cellular tower 108, 110, or 112, including an identification of the particular cellular tower providing the coverage region. For example, in an illustrative embodiment, when the mobile device 142 is within the cellular coverage region 114, the mobile device 142 can send and receive cellular transmissions from the cellular tower 108, including transmissions that identify the cellular tower 108.

In a particular embodiment, the mobile device 142 can include a processor 144 and a processor readable medium 146 accessible to the processor 144. A computer program 148 can be embedded in the processor readable medium 146. The computer program 148 can include processor instructions to transmit data to an advertisement provider 126. The data can identify the mobile device 142, a first time, and a cellular tower providing cellular communication to the mobile device 142 at the first time. In the particular illustrative embodiment of FIG. 1, the mobile device 142 is in the coverage area 114 and the first data can identify the cellular tower 108.

In a particular illustrative embodiment, the computer program 148 of the mobile device 142 can include processor instructions to periodically transmit the data at a specified time interval. In a particular illustrative embodiment, every fifteen minutes the computer program 148 can determine an identification of a cellular tower 108, 110, 112 that provides cellular coverage for the mobile device 142. In a particular illustrative embodiment, the computer program 148 can instruct the mobile phone 142 to transmit the cellular tower identification, a timestamp, and the International Mobile Equipment Identity (IMEI) number of the mobile device 142 to an advertising service via the identified cellular tower.

In a particular embodiment, the computer program 148 of the mobile device 142 is an applet that can have an interface to receive input data to control an operation of the applet. In an illustrative embodiment, a user of the mobile device 142 can control the computer program 148 by changing user settings via the interface. In a particular embodiment, the interface is accessible to the advertisement provider via data transmission from a cellular tower. The advertisement provider can transmit input data to control an operation of the computer program 148, such as changing the specified time interval for transmitting data, changing from periodic data transmission to transmission when cellular coverage is handed over to another cellular tower, prompting a user of the mobile phone 142 for input, controlling any other operation of the mobile phone 142, or any combination thereof.

Figure 2:
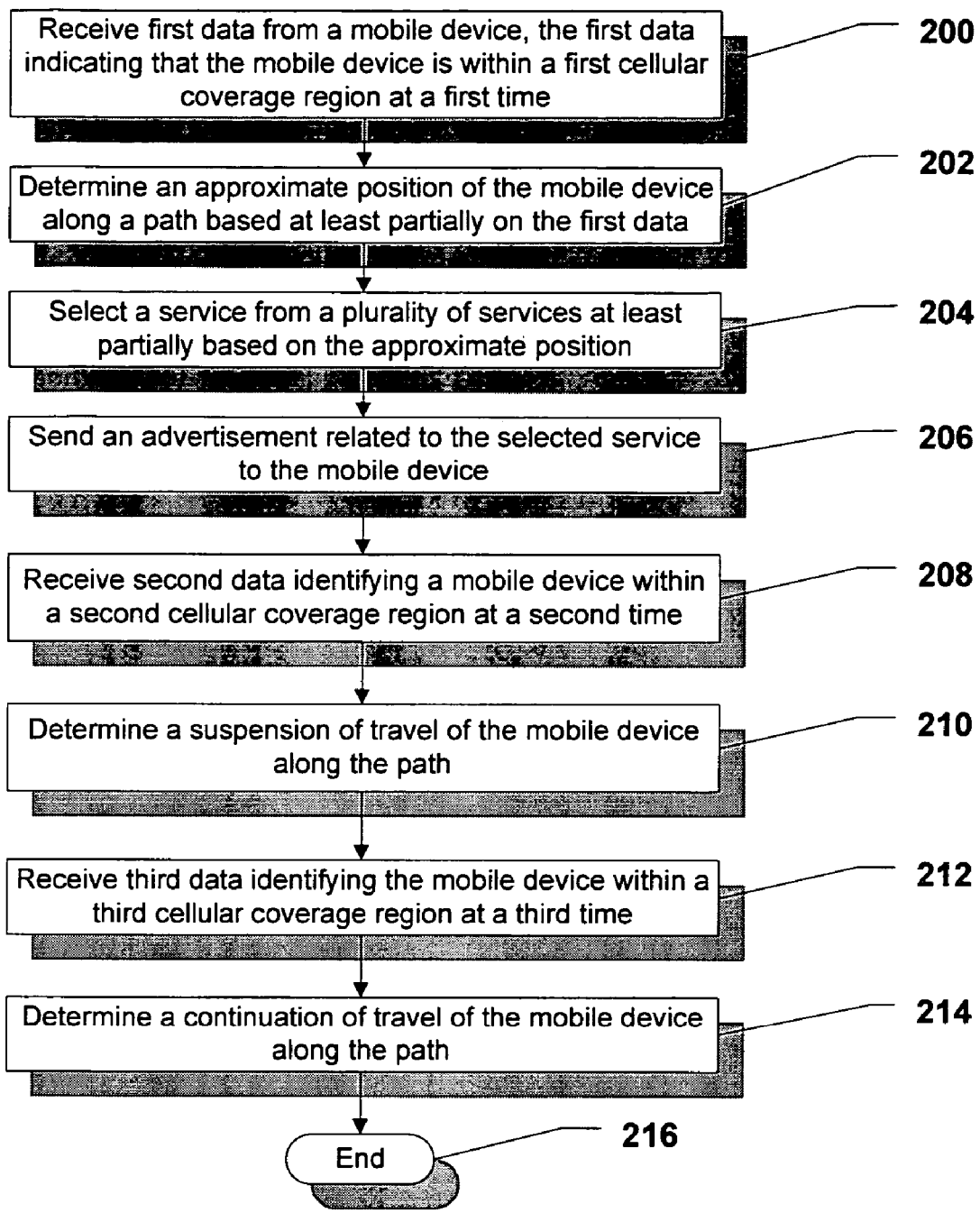
FIG. 2 is a flow diagram of a particular illustrative embodiment of a method of providing advertisements to mobile devices.

Referring to FIG. 2, a particular illustrative embodiment of a method of providing advertisements to mobile devices is depicted. At block 200, first data is received from a mobile device, the first data indicating that the mobile device is within a first cellular coverage region at a first time. In a particular embodiment, the first data can include an identification of the mobile device, an identification of a cellular tower providing the first cellular coverage region, and the first time. In an illustrative embodiment, the mobile device 142 depicted in FIG. 1 can transmit to the advertisement provider 126 an identifier of the cellular tower 108 providing cellular service and a timestamp of when the cellular tower 108 was identified. In an illustrative embodiment, the mobile device 142 transmits an IMEI identifier. In another illustrative embodiment, the mobile device 142 transmits a subscriber identifier number associated with the advertising provider 126.

Continuing to block 202, an approximate position of the mobile device along a path is determined based at least partially on the first data. The approximate position of the mobile device along the path can be determined without determining an approximate geographic location of the mobile device. Complex operations including triangulation and locating mobile devices in two-dimensional geographic coordinates with reference to roadway map data can thus be avoided. For example, a position of a traveler along a predefined path, such as along the route of an interstate highway, can be described with a starting point and a distance traveled from the starting point. As another example, a predefined path can be logically divided into sequential segments, each of which provides a reference for a position of a traveler. Because travel routes can include portions of one or more freeways, a traveler's predicted route may define a predetermined path that includes multiple sequential segments along different freeways.

In a particular embodiment, the approximate position along the path can be determined at least in part by retrieving stored data identifying a portion of the path within the first cellular coverage region. In a particular illustrative embodiment, an approximate position of the mobile device 142 depicted in FIG. 1 can be determined at least in part by retrieving stored data from the database 125 that relates the cellular coverage region 114 of the cellular tower 108 to a segment of the freeway 132. A more accurate approximate position can be determined by using previous data received from the mobile device 124 to establish historical speed and direction of travel information.

Moving to block 204, a service is selected from a plurality of services at least partially based on the approximate position. The service can be selected based at least partially on the approximate position located within a predetermined portion of the path. In a particular embodiment, a travel of the mobile device along the path can be estimated. The estimated travel can include a direction of travel, a rate of travel, or any combination thereof. The service can be selected based at least partially on the estimated travel of the mobile device along the path and a position on the path of a business providing the service. In a particular embodiment, a time of travel of the mobile device to the position of the business can be estimated, and the service can be selected based at least partially on the estimated time of travel.

Proceeding to block 206, an advertisement related to the selected service is sent to the mobile device. Continuing to block 208, in a particular embodiment, second data is received identifying a mobile device within a second cellular coverage region at a second time. Moving to block 210, in a particular embodiment, a suspension of travel of the mobile device along the path is determined. In a particular embodiment, the advertisement provider can suspend the transmittal of further advertisements until a continuation of travel of the mobile device is determined.

In an illustrative embodiment, a suspension of travel can be determined when a specified length of time elapses without receiving data indicating a change in cellular coverage region of the mobile device, such as when the first cellular coverage region and the second cellular coverage region are provided by the same cellular tower. In an illustrative embodiment, the specified length of time may be two hours, or three hours during daytime and one hour during nighttime, or any other specified length of time. In addition, the specified length of time can be determined based on other factors such as an average speed of the mobile device entering the cellular region, a size of the cellular coverage region, other pertinent factors, or any combination thereof.

Proceeding to block 212, in a particular embodiment, third data identifying the mobile device within a third cellular coverage region at a third time is received. Advancing to block 214, in a particular embodiment, a continuation of travel of the mobile device along the path is determined. For example, a continuation of travel can be determined when the third cellular coverage region is provided by a different cellular tower than the second cellular region. The method terminates at block 216.

In conjunction with the configuration of structure described herein, the systems and methods disclosed may receive first data identifying a mobile device, a cellular tower, and a time, and query a first database storing second data correlating the cellular tower to a segment of a freeway route. The disclosed systems and methods may identify an approximate position of the mobile device along the freeway route and query a second database storing third data correlating an available service to at least one predetermined position along the freeway route. The disclosed systems and methods may send an advertisement of the service to the mobile device.

Figure 3:
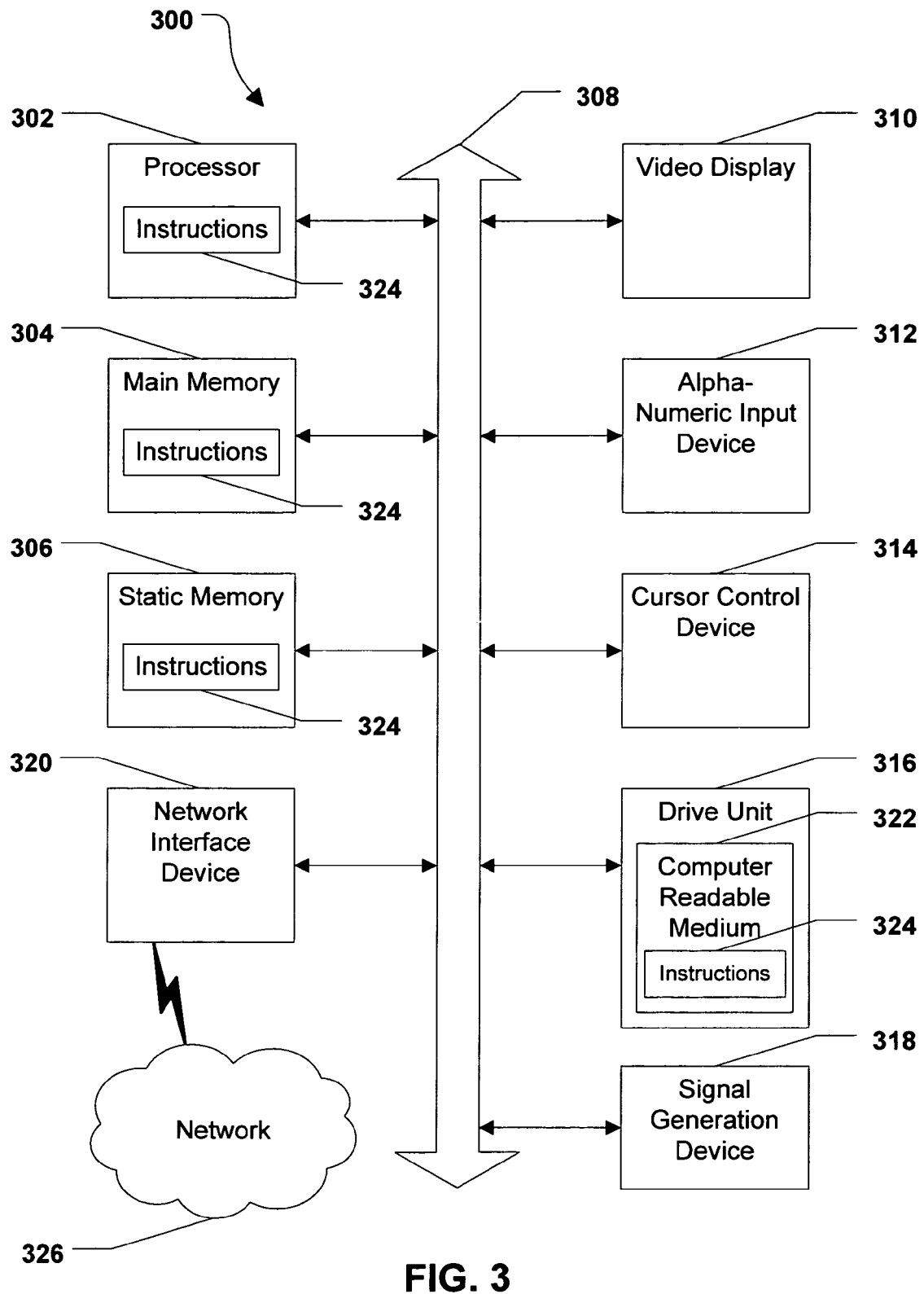
FIG. 3 is a diagram of an embodiment of a general computer system.

Referring to FIG. 3, an illustrative embodiment of a general computer system is shown and is designated 300. The computer system 300 can include a set of instructions that can be executed to cause the computer system 300 to perform any one or more of the methods or computer based functions disclosed herein. The computer system 300, or any portion thereof, may operate as a standalone device or may be connected, e.g., using a public network, such as the Internet, or a private network, to other computer systems or peripheral devices, including a switch, cellular tower, or mobile device, as depicted in FIG. 1.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. Moreover, the computer system 300 can include a main memory 304 and a static memory 306 that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. Further, the computer system 300 can include a wireless input device 315, e.g., a remote control device. When the computer system 300, or any portion thereof, is embodied in a set-top box device, the cursor control device 314 can be a remote control device. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk;

or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing advertisements to mobile devices, the method comprising:
   receiving first data at a system server from a mobile device, wherein the first data includes an identification of the mobile device, an identification of communication equipment providing a first coverage region, and a first time, the first data indicating that the mobile device is within the first coverage region at the first time;
   receiving a travel plan and a user preference at the system server from the mobile device, the travel plan identifying a beginning position and an ending position, the user preference indicating a preference for at least one service;
   determining, at the system server, an approximate position of the mobile device along a path based at least partially on the first data and the travel plan;
   selecting, at the system server, a service from a plurality of services at least partially based on the approximate position, the user preference, and the first time; and
   sending an advertisement related to the selected service to the mobile device from the system server.

2. The method of claim 1, wherein the approximate position of the mobile device along the path is determined without determining an approximate geographic location of the mobile device.

3. The method of claim 2, wherein the approximate position along the path is determined at least in part by retrieving stored data identifying a portion of the path within the first coverage region.

4. The method of claim 3, wherein the stored data is retrieved from a database that relates the first coverage region to a segment of a freeway.

5. The method of claim 1, wherein the communication equipment includes a cellular tower, and wherein the first coverage region includes a cellular coverage region.

6. The method of claim 5, further including:
   receiving second data at the system server from the mobile device, the second data identifying a second cellular tower and a second time;
   estimating, at the system server, a travel of the mobile device along the path, wherein the estimated travel includes a direction of travel, a rate of travel, or any combination thereof; and
   wherein the service is selected based at least partially on the estimated travel of the mobile device along the path and a position on the path of a business providing the service.

7. The method of claim 6, wherein the service is selected based at least partially on the approximate position located within a predetermined portion of the path.

8. The method of claim 6, further comprising estimating, at the system server, a time of travel of the mobile device to the position of the business; and wherein the service is selected based at least partially on the estimated time of travel.

9. The method of claim 1, further comprising:
receiving, at the system server, second data identifying the mobile device within a second coverage region at a second time; and
determining, at the system server, a suspension of travel of the mobile device along the path.

10. The method of claim 9, further comprising:
receiving, at the system server, third data identifying the mobile device within a third coverage region at a third time; and
determining, at the system server, a continuation of travel of the mobile device along the path.

11. The method of claim 1, wherein the beginning position and the ending position are along a freeway route.

12. The method of claim 1, wherein a restaurant service is selected when the first time is associated with a common meal time.

13. The method of claim 1, wherein a lodging service is selected when the first time is associated with nighttime.

14. The method of claim 1, wherein the approximate position of the mobile device is determined based at least in part on the travel plan and a distance traveled from the beginning position.

15. A system, comprising:
a processor; and
a processor readable medium accessible to the processor, the processor readable medium containing instructions executable by the processor to:
receive first transmitted data identifying a mobile device, a cellular tower, and a time;
query a first database to receive first stored data correlating the cellular tower to a segment of a freeway route;
receive a travel plan and a user preference from the mobile device, the travel plan identifying a beginning position and an ending position, the user preference indicating a service preference;
determine an approximate position of the mobile device along the freeway route based at least partially on the first stored data and the travel plan;
query a second database to receive second stored data correlating an available service to the time, to the user preference and to at least one predetermined position along the freeway route; and
send an advertisement related to the service to the mobile device.

16. The system of claim 15, wherein the advertisement of the service conforms with the service preference, wherein the service preference specifies that a restaurant service is preferred when the time is associated with a common meal time, and wherein the service preference specifies that a lodging service is preferred when the time is associated with nighttime.

17. The system of claim 15, wherein the approximate position of the mobile device is determined based at least in part on the travel plan and a distance traveled from the beginning position.

18. A mobile device, comprising:
a processor;
a processor readable medium accessible to the processor; and
a computer program embedded in the processor readable medium, the computer program comprising instructions executable by the processor to:
receive a travel plan and a user service preference from a user, the travel plan identifying a beginning position and an ending position;
transmit data to an advertisement provider system, the data identifying the mobile device, a first time, the travel plan, the user service preference, and a cellular tower providing cellular communication to the mobile device at the first time; and
communicate with the advertisement provider system to receive a selected advertisement, the selected advertisement selected based on at least the first time and the user service preference.

19. The mobile device of claim 18, wherein the computer program further comprises instructions executable by the processor to periodically transmit the data at a time interval.

20. The mobile device of claim 18, wherein the computer program is an applet.

21. The mobile device of claim 20, wherein the applet includes an interface to receive input data to control an operation of the applet.

22. The mobile device of claim 21, wherein the interface is accessible by the advertisement provider system via a transmission from the cellular tower.

23. A processor readable medium embodying executable instructions, the executable instructions including instructions to:
receive a travel plan and a user service preference from a user of a mobile device at a first time, the travel plan identifying a beginning position and an ending position; and
transmit data to an advertisement provider system, the data identifying the mobile device, the first time, the travel plan, a cellular tower providing cellular communication to the mobile device at the first time, and the user service preference, wherein the user service preference specifies that a restaurant service is preferred when the first time is associated with a common meal time, and wherein the user service preference specifies that a lodging service is preferred when the first time is associated with nighttime.

* * * * *